Oct. 17, 1933.  A. COLCA  1,930,850
CULTIVATOR
Filed Oct. 24, 1932
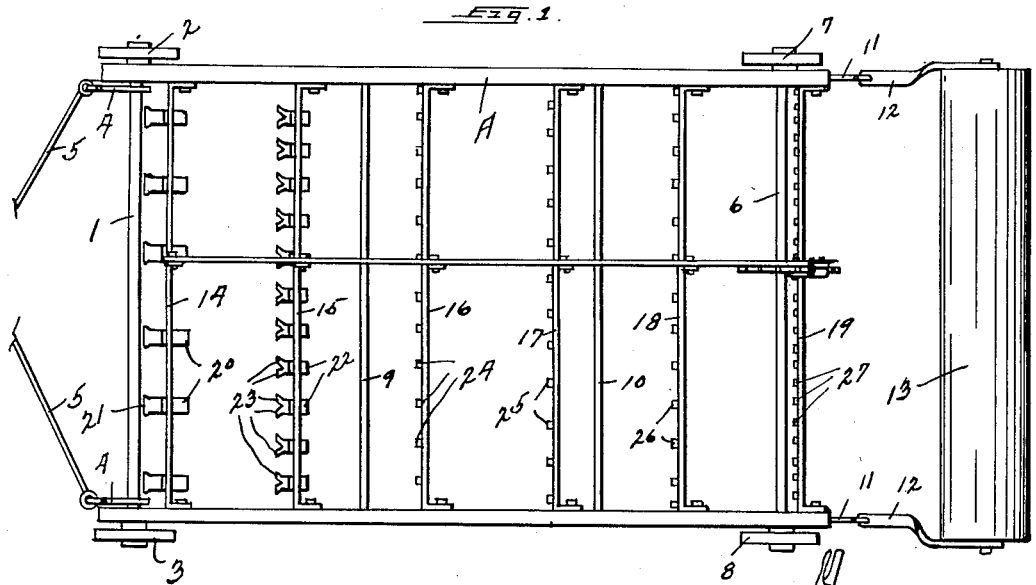
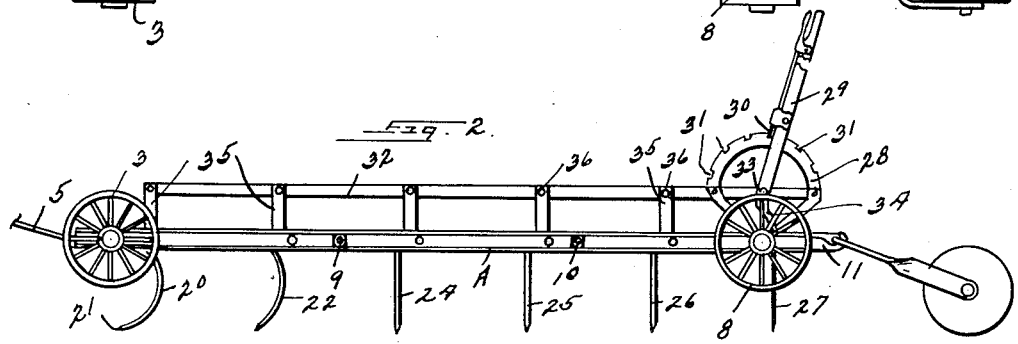
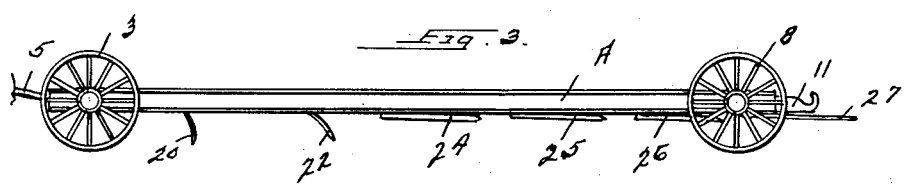
Inventor
Antonio Colca
By R. M. Thomas
Attorney Patented Oct. 17, 1933

1,930,850

UNITED STATES PATENT OFFICE 1,930,850

CULTIVATOR

Antonio Colca, Centerville, Utah

Application October 24, 1932. Serial No. 639,174

2 Claims. (Cl. 55—12)

My invention relates to cultivators and has for its object to provide a new and efficient combination spring tooth harrow, cutter tooth harrow, breaker harrow, and leveling rake.

A further object is to provide a combination spring tooth, common tooth harrow, and leveling rake followed up by a roller.

A still further object is to provide a cultivating harrow in which the body and teeth may be folded up out of the way and the body thereof let down onto wheels to carry the cultivator wherever desired without danger to any of the parts thereof.

These objects I accomplish with the device illustrated in the accompanying drawing in which similar numerals and letters of reference indicate like parts throughout the several views and as described in the specification hereunto annexed and pointed out in the appended claims.

In the drawing

Figure 1 is a plan view of the device.

Figure 2 is a side elevation of the device, as when used.

Figure 3 is a side elevation of the device shown running on support wheels.

In the drawing I have shown the body A, as made of two parallel pieces of channel iron secured together by a front axle 1, and spaced apart braces 9 and 10, and a rear axle 6.

Onto the ends of the axle 1, I mount wheels 2 and 3, to support the front end of the device and onto the ends of the axle 6, I provide wheels 7 and 8 on which the rear end of the device may be supported. Onto the axle 1 inside the sides of the body A, I provide draft links 4, to which draft rods 5 are secured to draw the device. Onto the back end of the side members of the body A, I provide draft links 11, to which links 12 are secured, the links 12 being secured to the roller 13. The roller is weighted to mash the soil down to produce a dust mulch on the top surface.

Across the body I then provide bars 14, 15, 16, 17, 18 and 19, said bars having the ends turned at right angles thereto and with the ends pivotally secured to the inside surface of the sides of the frame body A, by suitable pivot bolts.

To the bar 14, I then secure spaced apart spring tooth members 20, with the ends 21 of the teeth curved forward to engage the soil, and to the bar 15, I secure spaced apart semi-spring tooth members 22 with the free ends of the members 22 bifurcated at 23. These members 22 are spaced behind each of the members 20, with an extra member between each of the members 20 in the line of draft. Onto the bars 16, 17 and 18, I then secure common harrow teeth 24, 25, and 26.

Onto the bar 19 I secure fine slightly spaced apart rake teeth 27, to level and finely pulverize the soil.

A segment 28 is secured above the device having sockets 31 therein in which the dog 30 of the handle 29 engages for securing the teeth at a desired level. A pivot 33 connects the lever 29 with a bracket 34 to actuate the bar 19, and bars 35 connect a control rod 32 with each of the bars 14, 15, 16, 17 and 18, by passing pivot pins 36 through the rod 32 and the upper ends of the bars 35.

The teeth 20 of the spring tooth portion of the device break the ground and the bifurcated ends 23 of the spring tooth members 22 more finely break the ground. Then the harrow teeth 24, 25 and 26, evenly divide the remainder of the soil and the rake teeth 27 break up what fine particles are left and even off the surface of the soil. The roller 13 then passing over the soil packs it ready for planting. If desired the roller may be removed.

Having thus described my invention, I desire to secure by Letters Patent and claim:

1. In a cultivator, the combination of a body, braces therefor, axles on which the front and rear ends of the body are mounted; wheels on which the cultivator may be carried when not in use; spaced apart pivotally supported bars between the sides of the said body, spring tooth members secured to the front bar, bifurcated spring tooth members secured to the next bar and spaced apart fine harrow teeth secured to the other bars to evenly and finely divide the surface over which the device is passing; and a roller mounted at the rear of the device to roll the divided particles of the soil into a dust mulch.

2. In a cultivator, the combination of a wheel supported body, spaced apart bars mounted pivotally to said body; spring tooth members secured to the front bar, bifurcated spring tooth members secured to next bar and spaced apart fine harrow teeth secured to the others bars to evenly and finely divide the surface over which the device is passed; and means to actuate said bars to raise the teeth from the soil and allow the body to roll on the support wheels.

ANTONIO COLCA.